United States Patent

Marchetti

Patent Number: 5,869,201
Date of Patent: *Feb. 9, 1999

[54] HYDROPHILIC, GRAPHITE FUEL CELL ELECTRODE FOR USE WITH AN IONOMER MEMBRANE

[75] Inventor: George A. Marchetti, Western Springs, Ill.

[73] Assignee: George Marchetti, Western Springs, Ill.

[*] Notice: This patent issued on a continued prosecution application filed under 37 CFR 1.53(d), and is subject to the twenty year patent term provisions of 35 U.S.C. 154(a)(2).

[21] Appl. No.: 586,626

[22] Filed: Dec. 22, 1995

[51] Int. Cl.$^6$ ................................................. H01M 4/96
[52] U.S. Cl. ............................ 429/30; 429/42; 423/448
[58] Field of Search ...................... 429/30, 33, 40, 429/42, 44, 41; 427/115; 502/101; 423/448

[56] References Cited

U.S. PATENT DOCUMENTS

| | | | |
|---|---|---|---|
| 4,044,193 | 8/1977 | Petrow et al. | 429/40 |
| 4,610,938 | 9/1986 | Appleby | 429/42 |
| 4,865,930 | 9/1989 | Kindler et al. | 429/41 X |
| 4,876,115 | 10/1989 | Raistrick | 427/115 |
| 5,211,984 | 5/1993 | Wilson | 427/115 |
| 5,234,777 | 8/1993 | Wilson | 429/33 |
| 5,272,017 | 12/1993 | Swathirajan et al. | 429/42 X |
| 5,277,996 | 1/1994 | Marchetti et al. | 429/44 |
| 5,547,911 | 8/1996 | Grat | 429/42 X |
| 5,561,000 | 10/1996 | Dirven et al. | 429/42 |
| 5,563,109 | 10/1996 | Risse | 429/42 X |
| 5,620,807 | 4/1997 | Mussell et al. | 429/42 X |

OTHER PUBLICATIONS

Wilson, M.S., Springer, T.E., Zawodzinski, T.A., and Gottesfeld, S., *Recent Achievements in Polmer Electrolyte Fuel Cell (PEFC) Research at Los Alamos National Laboratory*, Jul. 30, 1991, LA–UR–91–1708, DE91 013683, Los Alamos National Laboratory, Los Alamos, New Mexico 87545.

Webb, Jeremy, *Hydrogen–powered electric car set sceptics wondering*, New Scientist, No. 1775, Jun. 29, 1991, p. 30.

Ye, Siyu; Vijh, Ashok K., and Dao, Le H., *A New Fuel Cell Electrocatalyst Based on Highly Porous Carbonized Polyacrylonitrile Foam with Very Low Platinum Loading*, J. Electrochem. Soc., vol. 143, No. 1, Jan., 1996; pp. L7–L9.

Uchida, Makoto; Aoyama, Yuko; Eda, Nobuo; and Ohta, Akira, *New Preparation Method for Polymer–Electrolyte Fuel Cell*, J. Electrochem. Soc., vol. 142, No. 2, Feb., 1995, pp. 463–468.

Williams, Robert H., *Fuel cells convert a fuel's energy directly into electricity, without combustion and without moving parts.*, Technology Review, Apr., 1994, pp. 22–30.

Ticianelli, Edson A., Derouin, Charles R., and Srinivasan, Supramaniam, *Localization of platinum in low catalyst loading electrodes to attain high power densities in SPE fuel cells*, Journal of Electroanalytical Chemistry and Interfacial Electrochemistry, vol. 251, No. 2, Sept. 23, 1988, pp. 275–295.

(List continued on next page.)

Primary Examiner—Anthony Skapars
Attorney, Agent, or Firm—Schwegman, Lundberg, Woessner, and Kluth, P.A.

[57] ABSTRACT

The present invention includes a gas-permeable, hydrophilic, graphite fuel cell electrode for use in conjunction with an ionomer membrane. The fuel cell electrode includes a first graphite portion enclosing micropores and mesopores, terminating in a first surface for contacting fuel or oxidant. The electrode also includes a second graphite portion enclosing micropores, adjacent and integral to the first portion. The second portion terminates in a second surface, opposing the first surface, for contacting fuel or oxidant. The electrode also includes a catalyst layer which is deposited onto the second surface.

11 Claims, 2 Drawing Sheets

OTHER PUBLICATIONS

Srinivasan, Supramaniam, *Fuel Cells for Extraterrestrial and Terrestrial Applications*, Journal of Electrochemical Society, vol. 136, No. 2, Feb., 1989, pp. 41C–48C.

Weber, Michael F., Mamiche–Afara, Suzanne, Dignam, Michael J., Pataki, Leslie, and Venter, Ronald D., *Sputtered Fuel Cell Electrodes*, Journal of Electrochemical Society, vol. 134, No. 6, Jun., 1987, pp. 1416–1419.

Srinivasan, S.,; Ticianelli, E.A., Derouin, C.R., and Redondo, A., *Advances in Solid Polymer Electrolyte Fuel Cell Technology with Low Platinum Loadin Electrodes*, Journal of Power Sources, vol. 22, Nos. 3 & 4, Mar./Apr. 1988, pp. 359–375.

Ticianelli, E.A., Derouin, C.R., Redondo, A., and Srinivasan, S., *Methods to Advance Technology of Proton Exchange Membrane Fuel Cells*, Journal of Electrochemical Society, vol. 135, No. 9, Sept., 1988, pp. 2209–2214.

HYDROPHILIC, GRAPHITE FUEL CELL ELECTRODE FOR USE WITH AN IONOMER MEMBRANE

FIELD OF THE INVENTION

This invention relates to an improved fuel cell electrode and to a method for manufacturing the electrode. The electrode is designed to be utilized with an ionomer membrane in a fuel cell assembly.

BACKGROUND ART

Fuel cells are primary generators of electrical power. Fuel cells are similar to chemical batteries, such as lead or alkaline batteries, in that electricity is generated from the reaction of the fuel and the oxidant. Unlike chemical batteries, however, the fuel and oxidant in a fuel cell is continuously resupplied. Thus, a fuel cell never has to be electrically recharged. The cell only requires a new supply of fuel and oxidant for continued operation.

A fuel cell consists of two chambers, one containing the fuel, usually hydrogen, and the second containing an oxidant, usually oxygen or an oxygen-rich gas such as air. The hydrogen and oxidant chambers sandwich two electrodes which in turn surround an electrolyte. Hydrogen molecules are adsorbed at one electrode (the anode) to break the hydrogen molecular bonds, creating hydrogen ions and free electrons. These electrons, as will be discussed, flow from the anode to a load device, such as a light bulb, and flow on to the other electrode, the cathode. Oxygen molecules are adsorbed at the cathode, and the hydrogen ions, migrating through the electrolyte, react with the oxygen molecules at the cathode in a reduction reaction to produce water. The adsorption of the hydrogen and oxygen molecules is stimulated by the use of a catalyst layer serving as the interface of each of the two electrodes and the electrolyte. The potential difference existing between the hydrogen and oxygen electrodes (anode and cathode, respectively) thus creates an electrical current. Once the electrons reach the cathode, they are consumed by the reduction reaction.

Fuel cells which use an ionomer membrane as the electrolyte have a significant advantage over fuel cells which use a liquid electrolyte system. Liquid electrolyte systems, such as the alkaline or phosphoric acid systems, require complex subsystems to assure the purity of the electrolyte, its continuous circulation and, most importantly, that a fixed three-phase boundary is maintained. The three-phase boundary is the interface at which the reactant gases, the catalyst and the electrolyte meet. Unless precise controls are maintained, the liquid electrolyte can flood the three-phase boundary and thereby prevent the reactant gases from efficiently reaching the catalyst.

An ionomer membrane, e.g., the DuPont product known as Nafion®, eliminates the need for complex electrolyte subsystems and the precise controls otherwise necessary to maintain a fixed, three-phase boundary in a fuel cell. Nafion® is a proton exchange type of ionomer membrane. Acid groups, bonded within the membrane, facilitate the transit of protons from one side of the membrane to the other. Hydrogen ions are the typical species of proton which is transported using a proton exchange membrane. The transport of hydrogen ions within the membrane proceeds via a Grothius chain mechanism and, therefore, four to six water molecules are required for each hydrogen ion transported. If the ionomer membrane is not sufficiently hydrated, reduced hydrogen ion transfer will occur, and the fuel cell's performance will degrade. In extreme cases, dehydration of the membrane at elevated temperatures can lead to cracking of the membrane and loss of its ion-conducting capability. Thus, while ionomer membranes represent an advance over liquid electrolyte systems for fuel cell purposes, they present their own unique problems in designing a practical fuel cell assembly.

In order to deal with the dehydration problem, which is inherent to the use of an ionomer membrane, other fuel cell designers have chosen to use a hydrophobic electrode in conjunction with the membrane. A hydrophobic electrode will tend to retain water within the membrane and thereby reduce the overall loss of water from fuel cell assembly during operation. Hydrophobic fuel cell electrodes are typically composed of high surface area carbon particles, a graphite cloth backing layer and Teflon®. Teflon® particles, dispersed in an aqueous suspension, and the carbon particles are mixed. The mixture is applied to the graphite cloth backing layer. The electrode is then heated in order to sinter the Teflon® particles. The sintered Teflon® particles are hydrophobic and also serve to provide channels for the reactant gasses to reach the three-phase boundary. The electrical current produced at the catalyst layer flows via the carbon particles to the graphite cloth backing and then to a current collector. A typical hydrophilic electrode is the Prototech® electrode, manufactured by E-Tech in Ohio.

Unfortunately, hydrophobic electrodes present significant water management problems also. Indeed, water management has been a continuing and vexatious problem when hydrophobic electrodes are used in conjunction with a proton exchange membrane. In order to supply sufficient humidification for the membrane, water must be condensed onto the hydrogen-side electrode through the use of a separate complex subsystem.

Thus, state-of-the-art fuel cell electrodes, when used in conjunction with an ionomer membrane, have two principal deficiencies. First, the electrodes rely upon a pressure contact between carbon particles for electrical conductivity. Even with a graphite cloth backing, there is significant electronic resistance within the electrode because of this type of structure. Second, maintaining humidification of the membrane is difficult and requires an elaborate subsystem.

SUMMARY OF THE INVENTION

The present invention includes a gas-permeable, hydrophilic, graphite fuel cell electrode for use in conjunction with an ionomer membrane. The fuel cell electrode includes a first graphite portion enclosing micropores and mesopores, terminating in a first surface for contacting fuel or oxidant. The electrode also includes a second graphite portion enclosing micropores, adjacent and integral to the first portion. The second portion terminates in a second surface, opposing the first surface, for contacting fuel or oxidant. The fuel cell electrode also includes a catalyst layer that is deposited onto the second surface.

The present invention also includes a fuel cell assembly. The assembly includes a fuel side electrode, an ionomer membrane contacting the fuel side electrode, and an oxidant side electrode. The oxidant side electrode is substantially identical to the fuel side electrode and opposes the fuel side electrode, contacting the ionomer membrane.

The present invention further includes a method for making a hydrophilic, graphite fuel cell electrode. The method includes providing a graphite main body. The graphite main body is free of particles of Teflon® and carbon. The graphite has a density of about one-half that of pure graphite. The graphite is roughened and thinned to a thickness of about 75 microns. The graphite main body has a first smooth surface and a second surface enclosing micropores and mesopores.

BRIEF DESCRIPTION OF THE DRAWINGS

The invention may be better understood from the following detailed description when read with reference to the drawings in which.

DETAILED DESCRIPTION OF THE PREFERRED EMBODIMENTS

Figure 1:
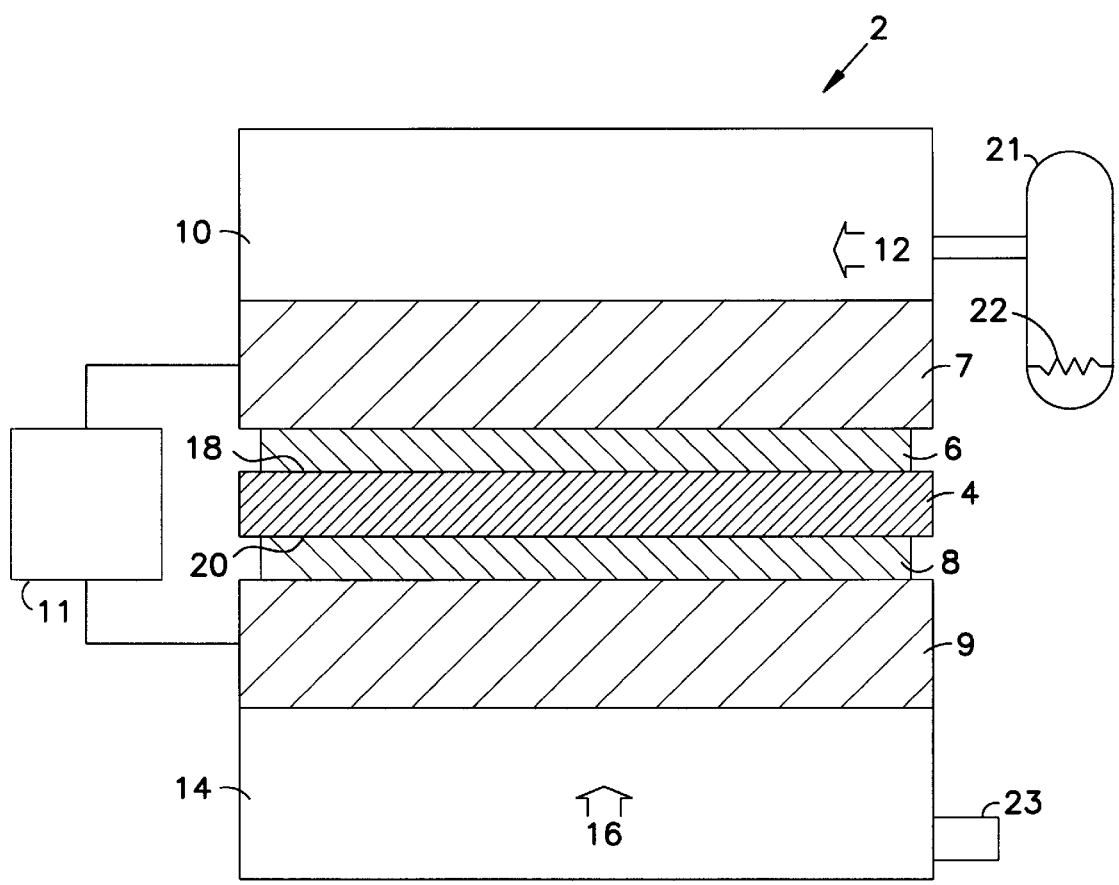
FIG. 1 shows a schematic cross-sectional view of the electrodes of the present invention installed in a hydrogen fuel cell.

The fuel cell electrode of the present invention is made entirely of graphite. Neither Teflon® nor carbon particles form any part of the fuel cell structure. The electrode graphite is made from a graphite precursion material manufactured by Johnson and Matthey, Product No. 10832. The graphite precursion material, as received, has a density which is one-half that of pure graphite and is 0.254 mm thick. The as-received material is neither gas-permeable nor appreciably hydrophilic.

Once obtained, the precursor graphite material is processed in a rotary press between sheets of sandpaper. The precursor material is roughened, indented and/or punctured by the sandpaper grit. The graphite material is continuously thinned by the pressure applied by the rotary press. The processing is continued until the graphite has been reduced in thickness to approximately 125 microns and few, if any, visible holes remain, to form an electrode with a front side and a back side. The back side of the electrode is then stripped off with tape. The electrode is pressed one final time with a Teflon® surface on the front side of the electrode and sandpaper on the back side. It is contemplated that the electrode may be mass-produce by using high-speed, rotary presses with rollers that have been pre-roughened to simulate the effect of the sandpaper grit.

The processed graphite electrode is approximately 75 microns thick and is very flexible. The electrode resembles a piece of paper with respect to its thickness and flexibility. The electrode includes the front side terminating in a front surface that is relatively smooth and permits gas flow through micropores created by the processing. The electrode also includes the back side terminating in a back surface that is a rougher surface with micropores and mesopores in the graphite.

The electrode permits excellent gas flow from the back surface of the electrode to the front surface via the micropores and mesopores in the processed material. It has been found that since sintered hydrophobic Teflon® is not used to create the gas channels, humidified hydrogen gas readily supplies all of the moisture necessary to maintain hydration of the membrane, even at elevated internal fuel cell temperatures. Additionally, the internal electronic resistance of the graphite electrode itself is low, being approximately 0.2 ohms from the front surface of the electrode to the current collection points on the back of the electrode.

After deposition of a catalyst on the front surface of the electrode, the electrode is hot-pressed to an ionomer membrane to complete the fuel cell assembly.

The present invention is a radical departure from prior attempts to create a fuel cell electrode which is compatible with an ionomer membrane. Instead of a hydrophobic electrode, the invention is a hydrophilic electrode, which allows continuous humidification of the membrane. Instead of trapping water within the membrane (as current state-of-the-art electrodes do), the hydrophilic fuel cell electrode allows humidification to be continually resupplied with the fuel. The membrane is thereby continuously hydrated, and the intractable water management problem heretofore associated with ionomer membrane fuel cells is eliminated. In addition, since the invention is composed entirely of graphite, the electrical conductivity of the electrode is excellent.

The improved hydrophilic fuel cell electrodes according to the present invention are shown in a fuel cell 2 illustrated in FIG. 1. The fuel cell 2 is centered around an electrolyte matrix 4 which is an ionomer membrane. The ionomer membrane 4 in the preferred embodiment is a solid polymer electrolyte manufactured by DuPont under the brand name Nafion® with a thickness of 0.175 mm. The membrane 4 is located between a pair of electrodes, anode 6 and cathode 8.

The Nafion membrane is preferably cleaned by conventional methods prior to installation and use. In one embodiment, the membrane is cleaned with an aqueous solution of hydrogen peroxide, about 5 percent by weight, to remove organic impurities. The membrane is then soaked in a solution of 0.5 molar sulfuric acid to remove metal impurities and is rinsed in distilled water to remove remaining sulfuric acid. This method of cleaning is described in the J. Electro Analytical Chem. 251 No. 2, Sep. 23, 1988 at page 275.

A gas-permeable current collector is connected to anode 6 by a pressure contact. The current collector must be composed of a material which does not structurally deteriorate or lose electrical conductivity in the fuel cell environment. Materials such as stainless steel, titanium, nickel or graphite can be used. The current collector 7 can either be a ribbed plate, with the gases flowing between the ribbed sections, or it can be a gas-permeable frit made of sintered material. A second gas-permeable, current collector 9 is connected to cathode 8. The fuel cell 2 is activated when current collectors 7 and 9 are connected to an electrical load 11 completing an electrical circuit. Electrical load 11 may be any electrical device, such as a light bulb or motor.

The anode 6 is placed between the ionomer membrane 4 and the gas or fuel manifold 10 which contains fuel 12. In this embodiment, the fuel 12 is hydrogen gas, at a pressure of one atmosphere. The interface between fuel manifold 10 and anode 6 allows the flow of fuel 12 to the anode 6. Cathode 8 is placed between the electrolyte matrix 4 and the oxidant manifold 14 through which oxidant 16 flows at a pressure of about 4 atmospheres. The interface between oxidant manifold 14 and cathode 8 allows the flow of oxidant 16 to cathode 8. In this embodiment, the oxidant 16 is compressed, breathable air. Surface 18 of anode 6 in contact with electrolyte membrane 4 contains a catalyst material. This material is typically a metal and, in the preferred embodiment, the catalyst is platinum. Similarly, surface 20 of the cathode 8 contacts electrolyte matrix 4 and also contains a platinum catalyst layer according to the preferred embodiment. The hydrogen gas is humidified by passing it through a water chamber 21 before it enters the hydrogen manifold. Water in the water chamber can be heated with a high resistance electrical coil 22.

Humidified hydrogen gas 12 from manifold 10 diffuses through anode 6 towards electrolyte membrane 4. As the hydrogen gas 12 is adsorbed by the catalyst 18, the bonds between the hydrogen molecules are broken by the oxidation reaction, producing hydrogen ions and free electrons. The hydrogen ions then diffuse through the electrolyte membrane 4 to interface 20 located proximate to cathode 8. The electrons preferentially flow from anode 6 to current collector 7 since electrolyte membrane 4 is an electronic insulator. The electrons thus flow towards cathode 8 by means of current collector 9, creating a current and generating a voltage to drive electric load 11. This voltage is equivalent to the potential difference between anode 6 and cathode 8. In the preferred embodiment, this potential difference is approximately 1 volt at open circuit. Voltage will vary with the current drawn through the load. Of course, this voltage may be increased to any desired voltage by putting multiple fuel cells in series. High-voltage fuel cell batteries can be fabricated in this manner using the invention as a principal component. The electrons move through current collector 9 and diffuse through cathode 8 where upon, arrival, they are recombined with the oxidant and the hydrogen ions. Simultaneously, oxidant 16 diffuses through cathode 8 and is adsorbed by the catalyst 20 to react with the hydrogen ions and arriving electrons in a reduction reaction to form water.

Figure 2:
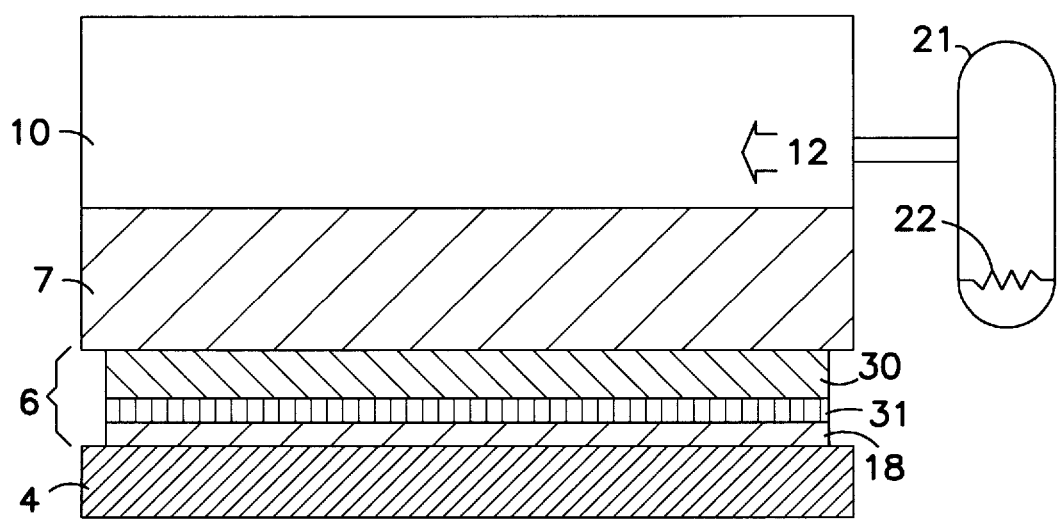
FIG. 2 shows a schematic cross-sectional view of the layers of the electrode of the present invention.

Electrodes 6 and 8 are similar. Anode 6, which is connected to current collector 7 according to the invention, is shown in FIG. 2. This figure is not drawn to scale in order to clearly illustrate surface 18, which is the catalyst interface to electrolyte membrane 4. The anode 6 is in direct physical contact with the fuel manifold 10 and is permeable to the flow of humidified hydrogen gas 12 through current collector 7.

The anode 6 is composed of three distinct layers. The layer of the electrode 30 which is adjacent to the hydrogen manifold 10 is composed of graphite with hundreds of micropores and mesopores per square inch to permit the flow of humidified hydrogen gas 12. The second layer of the electrode 31 is relatively smooth and is composed of a microporous graphite layer. The microporous graphite layer 31 is deliberately made to be smooth in order to assure good physical contact with the electrolyte membrane 4 on hot pressing. The third layer is the catalyst layer 18. The catalyst in the preferred embodiment is high surface area platinum.

The microporous graphite layer 31 allows the deposition of the catalyst layer 18 directly onto the solid surface of anode 6. The anode 6 thereby forms a structural and electronic support for the catalyst layer 18. The catalyst layer 18 can be deposited onto the anode 6 by thermal deposition, electroplating, sputtering or other methods. Although microporous graphite layer 31 forms a solid surface for the deposition of catalyst layer 18, the anode 6 still allows the humidified hydrogen gas 12 at a pressure of about 1 atmosphere to reach and infiltrate the catalyst layer 18 through the pores in graphite layers 30 and 31 and continuously to humidify the electrolyte membrane 4. The anode 6 and cathode 8 are then hot-pressed to the electrolyte membrane 4 to create a unified fuel cell assembly with catalyst layer 18 in direct physical contact with the electrolyte membrane 4. The hot-pressed anode 6/electrolyte membrane 4/cathode 8 assembly is less than one-half millimeter thick.

Cathode 8 is constructed in the same manner as anode 6. The oxidant 16, which is either oxygen or air, flows from the oxidant manifold 14 through the micropores and mesopores of the first graphite layer 30 and through the microporous second graphite layer 31 to catalyst 20. Again, catalyst 20 in the preferred embodiment is high surface area platinum. The oxidant 16 is at a pressure of approximately 4 atmospheres.

In one embodiment, a hot iron is first used to tack the anode 6 and cathode 8 to the electrolyte membrane 4 to make an electrode assembly. This electrode assembly is then pressed between sheets of parchment paper in a preheated vise. The assembly is heated in an oven at approximately 325° F. for 45 seconds. A bonded electrode assembly results.

The hot-pressed electrode assembly is then placed between the anode current collector 7 and the cathode current collector 9 in the fuel cell 2.

Pressurized hydrogen 12 flows through the water chamber 21 and is humidified. The humidified hydrogen 12 then flows through the hydrogen manifold 10, the current collector 7 and the hydrophilic, gas-permeable anode 6 to the catalyst layer 18 where the oxidation reaction occurs. Pressurized air 16 flows through the oxidant manifold 14, the current collector 9 and the gas-permeable cathode 8 to catalyst layer 20 where the reduction reaction occurs. A slow bleed valve 23 in the oxidant manifold removes inert nitrogen and product water from the fuel cell. Nitrogen is present in the air 16, but does not take part in the reaction. Water is a product of the reaction. Some of the water is reabsorbed by the electrolyte membrane 4. The remainder is absorbed by the pressurized air 16 and removed from the fuel cell to the atmosphere via the slow bleed valve 23.

Thus, the present invention provides a fuel cell electrode which is thin, gas-permeable and hydrophilic, i.e., readily permits the passage of humidified hydrogen through the electrode and into the ionomer membrane. The invention provides a fuel cell electrode with low electronic resistance from the front surface of the electrode to the current collection points on the back surface of the electrode. The present invention also provides fuel cell electrodes that can be a hot-pressed onto the ionomer membrane in order to create a unified fuel cell assembly. The present invention also includes a fuel cell electrode with micropores and mesopores to permit gas flow but with few, if any, holes on the front surface, which would decrease the area available for catalyst deposition.

The aforementioned description is not to be interpreted to exclude other fuel cell arrangements advantageously employing the present invention. For example, other ionomer membranes, such as a proton exchange membrane produced by Dow Chemical Company may be utilized with equal or better effectiveness with the invention. Catalysts other than platinum very well also may be used. Furthermore, it is to be understood that the above-described fuel cell electrode is mainly an illustrative embodiment of the principles of this invention and numerous other arrangements and advantages may be devised by those skilled in the art without departing from the spirit and scope of the invention.

I claim:

1. A gas-permeable, hydrophilic, graphite fuel cell electrode for use in conjunction with an ionomer membrane, comprising:
   a. A first graphite portion enclosing micropores and mesopores, terminating in a first surface for contacting fuel or oxidant;
   b. A second graphite portion enclosing micropores, adjacent and integral to the first portion, terminating in a second surface, opposing the first surface, for contacting fuel or oxidant; and
   c. A catalyst layer wherein substantially all catalyst is deposited onto the second surface.

2. The fuel cell electrode of claim 1 which is used for a fuel side oxidation reaction.

3. The fuel cell electrode of claim 1 which is used for an oxidation side reduction reaction.

4. The fuel cell electrode of claim 1 and further including an ionomer membrane wherein the electrode is hot-pressed to the ionomer membrane.

5. The fuel cell electrode of claim 1 wherein the catalyst is platinum.

6. The fuel cell electrode of claim 1 wherein the first and second graphite portions have a density about one-half that of pure graphite.

7. The fuel cell electrode of claim 1 wherein the electrode has a thickness of about 75 microns.

8. The fuel cell electrode of claim 1 having an electronic resistance of about 0.2 ohms.

9. A fuel cell assembly comprising a fuel side electrode, an ionomer membrane contacting the fuel side electrode and an oxidant side electrode, substantially identical to the fuel side electrode, opposing the fuel side electrode, contacting the ionomer membrane, and further including a catalyst layer deposited on each of the fuel side electrode and oxidant side electrode as a layer on an outer surface of each electrode.

10. The fuel cell assembly of claim 9 wherein each of the fuel side electrode and oxidant side electrode is a hydrophilic graphite electrode that encloses micropores.

11. The fuel cell assembly of claim 9 and further including a current collector contacting each electrode.

* * * * *